United States Patent
Gold et al.

(10) Patent No.: US 12,263,636 B2
(45) Date of Patent: Apr. 1, 2025

(54) IN-PROCESS OPTICAL BASED MONITORING AND CONTROL OF ADDITIVE MANUFACTURING PROCESSES

(71) Applicant: General Electric Company, Schenectady, NY (US)

(72) Inventors: Scott Alan Gold, Waynesville, OH (US); John Poland, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 134 days.

(21) Appl. No.: 17/086,983

(22) Filed: Nov. 2, 2020

(65) Prior Publication Data

US 2022/0134647 A1    May 5, 2022

(51) Int. Cl.
| | |
|---|---|
| *B29C 64/165* | (2017.01) |
| *B29C 64/268* | (2017.01) |
| *B29C 64/393* | (2017.01) |
| *B33Y 10/00* | (2015.01) |
| *B33Y 50/02* | (2015.01) |
| *B33Y 30/00* | (2015.01) |

(52) U.S. Cl.
CPC .......... *B29C 64/165* (2017.08); *B29C 64/268* (2017.08); *B29C 64/393* (2017.08); *B33Y 50/02* (2014.12); *B33Y 10/00* (2014.12); *B33Y 30/00* (2014.12)

(58) Field of Classification Search
CPC .................................................. B29C 64/393
See application file for complete search history.

(56) References Cited

U.S. PATENT DOCUMENTS

| | | | |
|---|---|---|---|
| 4,863,538 | A | 9/1989 | Deckard |
| 5,264,678 | A | 11/1993 | Powell et al. |
| 5,304,329 | A | 4/1994 | Dickens, Jr. et al. |
| 5,427,733 | A | 6/1995 | Benda et al. |
| 5,460,758 | A | 10/1995 | Langer et al. |
| 5,609,813 | A | 3/1997 | Allison et al. |

(Continued)

FOREIGN PATENT DOCUMENTS

| | | |
|---|---|---|
| CN | 1976800 A | 6/2007 |
| EP | 2727709 A1 | 5/2014 |

(Continued)

OTHER PUBLICATIONS

Extended European Search Report for EP Application No. 21200888.2 dated Mar. 2, 2022 (10 pages).

(Continued)

*Primary Examiner* — John J DeRusso
*Assistant Examiner* — Xinwen Ye
(74) *Attorney, Agent, or Firm* — Dinsmore & Shohl LLP

(57) ABSTRACT

Systems and methods for optical based monitoring of additive manufacturing processes are provided. In one example a method includes obtaining optical data representing a layer of a structure being manufactured using an additive manufacturing process, comparing the optical data with a standard optical representation associated with the structure, determining one or more nonconformance conditions between the optical data representing the layer and the standard optical representation, and implementing a control action based at least in part on the one or more nonconformance conditions.

10 Claims, 6 Drawing Sheets

(56) References Cited

U.S. PATENT DOCUMENTS

| | | | |
|---|---|---|---|
| 5,961,859 A | 10/1999 | Chou et al. |
| 6,046,426 A | 4/2000 | Jeantette et al. |
| 6,815,636 B2 | 11/2004 | Chung et al. |
| 6,930,278 B1 | 8/2005 | Chung et al. |
| 6,995,334 B1 | 2/2006 | Kovacevic et al. |
| 7,757,632 B2 | 7/2010 | Edwards et al. |
| 8,137,739 B2 | 3/2012 | Philippi et al. |
| 8,243,334 B2 | 8/2012 | Abeloe |
| 8,260,447 B2 | 9/2012 | Mattes et al. |
| 8,508,809 B2 | 8/2013 | Hock |
| 9,248,623 B2 | 2/2016 | Pettis et al. |
| 9,662,840 B1 | 5/2017 | Buller et al. |
| 9,724,876 B2 | 8/2017 | Cheverton et al. |
| 9,855,698 B2 | 1/2018 | Perez et al. |
| 9,886,015 B2 | 2/2018 | Wilson et al. |
| 2003/0028278 A1 | 2/2003 | Darrah et al. |
| 2004/0173946 A1 | 9/2004 | Pfeifer et al. |
| 2004/0191106 A1 | 9/2004 | O'Neill et al. |
| 2004/0200816 A1 | 10/2004 | Chung et al. |
| 2005/0288813 A1 | 12/2005 | Yang et al. |
| 2007/0160820 A1 | 7/2007 | Waters |
| 2008/0015814 A1 | 1/2008 | Harvey, Jr. et al. |
| 2008/0169587 A1* | 7/2008 | Kihara | B22F 12/45 264/408 |
| 2008/0174631 A1 | 7/2008 | Habashi |
| 2009/0136122 A1 | 5/2009 | Gagne et al. |
| 2009/0152771 A1 | 6/2009 | Philippi et al. |
| 2009/0206065 A1 | 8/2009 | Kruth et al. |
| 2009/0298017 A1 | 12/2009 | Boerjes et al. |
| 2010/0007692 A1 | 1/2010 | Vanmaele et al. |
| 2010/0125356 A1* | 5/2010 | Shkolnik | B33Y 80/00 700/118 |
| 2010/0312375 A1 | 12/2010 | Yamazawa et al. |
| 2011/0032554 A1 | 2/2011 | Matsuhira |
| 2011/0061591 A1 | 3/2011 | Stecker |
| 2011/0278277 A1 | 11/2011 | Stork Genannt Wersborg |
| 2012/0027286 A1 | 2/2012 | Xu et al. |
| 2012/0203365 A1 | 8/2012 | Hummeler et al. |
| 2012/0237745 A1 | 9/2012 | Dierkes et al. |
| 2012/0312957 A1 | 12/2012 | Loney et al. |
| 2013/0155220 A1 | 6/2013 | Mahuna |
| 2013/0168902 A1 | 7/2013 | Herzog et al. |
| 2013/0278925 A1 | 10/2013 | Cheng |
| 2013/0300035 A1 | 11/2013 | Snis |
| 2014/0044822 A1 | 2/2014 | Mulliken |
| 2014/0163717 A1 | 6/2014 | Das et al. |
| 2014/0265047 A1 | 9/2014 | Burris et al. |
| 2014/0308153 A1 | 10/2014 | Ljungblad |
| 2014/0332507 A1 | 11/2014 | Fockele |
| 2014/0358273 A1 | 12/2014 | LaBossiere et al. |
| 2014/0364858 A1 | 12/2014 | Li et al. |
| 2015/0004046 A1 | 1/2015 | Graham et al. |
| 2015/0024233 A1 | 1/2015 | Gunther |
| 2015/0045928 A1 | 2/2015 | Perez et al. |
| 2015/0048064 A1 | 2/2015 | Cheverton et al. |
| 2015/0082498 A1 | 3/2015 | Meyer |
| 2015/0165683 A1 | 6/2015 | Cheverton et al. |
| 2015/0165693 A1 | 6/2015 | Sagoo et al. |
| 2015/0174822 A1 | 6/2015 | Huang et al. |
| 2015/0177158 A1 | 6/2015 | Cheverton |
| 2015/0266242 A1 | 9/2015 | Comb et al. |
| 2015/0367447 A1 | 12/2015 | Buller et al. |
| 2016/0114431 A1 | 4/2016 | Cheverton et al. |
| 2016/0144570 A1 | 5/2016 | Kim et al. |
| 2016/0159011 A1 | 6/2016 | Marchione et al. |
| 2016/0179064 A1 | 6/2016 | Arthur et al. |
| 2016/0279734 A1 | 9/2016 | Schick et al. |
| 2016/0318256 A1* | 11/2016 | Alkhatib | G06T 17/00 |
| 2016/0320532 A1 | 11/2016 | Purchase |
| 2016/0344948 A1 | 11/2016 | Bamberg et al. |
| 2017/0120376 A1 | 5/2017 | Cheverton et al. |
| 2017/0203512 A1 | 7/2017 | Gold |
| 2017/0232511 A1 | 8/2017 | Fieldman et al. |
| 2017/0232512 A1 | 8/2017 | Joerger |
| 2017/0232670 A1 | 8/2017 | Joerger et al. |
| 2017/0232671 A1 | 8/2017 | Fieldman |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |
| 2017/0235293 A1 | 8/2017 | Shapiro et al. |
| 2017/0239719 A1 | 8/2017 | Buller et al. |
| 2017/0246682 A1 | 8/2017 | Duerig |
| 2017/0246810 A1 | 8/2017 | Gold |
| 2017/0252805 A1 | 9/2017 | Gillespie et al. |
| 2017/0259504 A1 | 9/2017 | Lin et al. |
| 2017/0326790 A1 | 11/2017 | Lee et al. |
| 2017/0368753 A1* | 12/2017 | Yang | G01B 21/20 |
| 2018/0001384 A1 | 1/2018 | Manteiga et al. |
| 2018/0029306 A1 | 2/2018 | Gold et al. |
| 2018/0101167 A1 | 4/2018 | DehghanNiri et al. |
| 2018/0124341 A1 | 5/2018 | Harding et al. |
| 2018/0311898 A1 | 11/2018 | Schwarzbaum et al. |
| 2019/0099953 A1 | 4/2019 | MacNeish, III et al. |
| 2019/0118474 A1 | 4/2019 | Hikmet et al. |
| 2019/0217543 A1* | 7/2019 | Pontiller-Schymura | B22F 10/28 |
| 2019/0299536 A1 | 10/2019 | Putman et al. |
| 2021/0089003 A1* | 3/2021 | Guerrier | G05B 19/4099 |

FOREIGN PATENT DOCUMENTS

| | | |
|---|---|---|
| EP | 2773094 A1 | 9/2014 |
| EP | 3095591 A1 | 11/2016 |
| JP | 2004/306612 A | 11/2004 |
| JP | 2008/508129 A | 3/2008 |
| JP | 2012/509189 A | 4/2012 |
| JP | 2015/196164 A | 11/2015 |
| WO | WO2011/065920 A1 | 6/2011 |
| WO | WO2015/040185 A1 | 3/2015 |
| WO | WO2015/040433 A2 | 3/2015 |
| WO | WO2016/015752 A1 | 2/2016 |
| WO | WO2016/115095 A1 | 7/2016 |
| WO | WO2017/158327 A1 | 9/2017 |
| WO | 2018217903 A1 | 11/2018 |
| WO | 2019125970 A1 | 6/2019 |
| WO | WO-2019163495 A1 * | 8/2019 ............. B22F 10/20 |

OTHER PUBLICATIONS

Baskoro et al., Monitoring of Molten Pool Image During Pipe Welding in Gas Metal Arc Welding (GMAW) Using Machine Vision, Advanced Computer Science and Information System (ICACIS), 2011 International Conference, Dec. 17-18, 2011, Jakarta, pp. 381-384.

Conceptlaser, Ahead! Topologically Optimised Components in Aviation, 4 Pages. https://www.concept-laser.de/fileadmin/Blaue_Broschueren/1708_Aerospace_DE-EN_update_2__lowres_einzel.pdf.

Flynn et al., CCD Resolution for Optical Microscopy, Nikon MicroscopyU, The Source for Microscopy Education, 3 Pages. https://www.microscopyu.com/tutorials/ccd-resolution-for-optical-microscopy.

Jacobsmuhlen et al., High Resolution Imaging for Inspection of Laser Beam Melting Systems, IEEE International Instrumentation and Measurement Technology Conference, 2013, pp. 1-6.

Jacobsmuhlen et al., Robust Calibration Marker Detection in Powder Bed Images from Laser Beam Melting Processes, IEEE International Conference on Industrial Technology, 2016, pp. 910-915.

Jeng et al., On-Line Layer Monitoring and Defect Inspection of Model Maker Rapid Prototyping System Using Vision Technology, Journal of the Chinese Society of Mechanical Engineers, vol. 20, No. 6, 1999, pp. 575-584.

Jeng et al., On-Line Layer Profile Dimensions Measurement of Model Maker Rapid Prototyping Using Vision Technology, International Journal of Advanced Manufacturing Technology, vol. 17, 2001, pp. 125-133.

Jeng et al., On Line Model Accuracy Inspection of Model Maker Rapid Prototyping Using Vision Technology, International Journal of Advanced Manufacturing Technology, vol. 17, 2001, pp. 825-834.

(56) References Cited

OTHER PUBLICATIONS

Jiang et al., Research on Measuring and Control System of Metal Powder Laser Shaping, IEEE International Conference on Mechatronics and Automation, Jun. 25-28, 2006, pp. 1717-1721.

Krauss et al., Thermography for Monitoring the Selective Laser Melting Process, Proceedings of the Annual International Solid Freeform Fabrication Symposium, Aug. 22, 2012, pp. 999-1014.

Luo et al., Desktop Rapid Prototyping System with Supervisory Control and Monitoring Through Internet, IEEE/ASME Transactions on Mechatronics, vol. 6, No. 4, Dec. 2001, pp. 399-409.

SLM Solutions GmbH, Do you know everything about SLM?, Laser Melting, Company, Process, Systems, 8 pages.

Sood et al., Optimization of Process Parameters in Fused Deposition Modeling Using Weighted Principal Component Analysis, Journal of Advanced Manufacturing Systems, vol. 10, No. 2, 2011, pp. 241-259.

Spring et al., Introduction to Charge-Coupled Devices (CCDs), Nikon MicroscopyU, The Source for Microscopy Education, 19 Pages. https://www.microscopyu.com/digital-imaging/introduction-to-charge-coupled-devices-ccds.

Vlasea et al., Development of Powder Bed Fusion Additive Manufacturing Test Bed for Enhanced Real-Time Process Control, National Institute of Standards and Technology, Aug. 27, 2015, pp. 527-539.

Wikipedia, Digital Single-Lens Reflex Camera, Feb. 2, 2017, pp. 1-14. https://en.wikipedia.org/wiki/Digital_single-lens_reflex_camera.

Xing et al., Realt-Time Sensing and Control of Metal Powder Laser Forming, $6^{th}$ World Congress on Intelligent Control and Automation Jun. 21-23, 2006, Dalian China, vol. 2, pp. 6661-6665.

European Patent Office Action for Application No. 21200888.2 dated Jul. 26, 2023 (5 pages).

\* cited by examiner

IN-PROCESS OPTICAL BASED MONITORING AND CONTROL OF ADDITIVE MANUFACTURING PROCESSES

FIELD

The present disclosure generally relates to monitoring and controlling the build process of an additive manufacturing process.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a layer of a fused region in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

BRIEF DESCRIPTION

Aspects and advantages will be set forth in part in the following description, or may be obvious from the description, or may be learned through practice of the invention.

Methods and systems are generally provided for monitoring a layerwise additive manufacturing process.

For example, the method may include: obtaining, by a computing system comprising one or more computing devices, geometric measurement data captured by an image capture device, the geometric measurement data representing a layer of a structure being manufactured using an additive manufacturing process; comparing, by the computing system, the geometric measurement data with a standard optical representation associated with the structure; determining, by the computing system, one or more nonconformance conditions between the geometric measurement data representing the layer and the standard optical representation; and implementing, by the computing system, a control action based at least in part on the one or more nonconformance conditions.

In one embodiment, the system may include: a surface configured to hold one or more layers of a structure being manufactured by the layerwise additive manufacturing process; an image capture device configured to obtain geometric measurement data of the structure during the layerwise additive manufacturing process; one or more processors; and one or more memory devices, the one or more memory devices storing computer-readable instructions that when executed by the one or more processors cause the one or more processors to perform operations, the operations comprising: obtaining geometric measurement data captured by an imaging system, the geometric measurement data representing a layer of the one or more layers of the structure being manufactured using an additive manufacturing process; comparing the geometric measurement data with a standard optical representation associated with the structure; determining one or more nonconformance conditions between the geometric measurement data representing the layer and the standard optical representation; and implementing a control action based at least in part on the one or more nonconformance conditions.

Methods are also generally provided for manufacturing a part by laser additive manufacturing. For example, the method may include: (a) irradiating a layer of powder in a powder bed to form a fused layer; (b) providing a subsequent layer of powder over the powder bed by passing a recoater mechanism over the powder bed; (c) repeating steps (a) and (b) to form the part in the powder bed; (d) while conducting steps (a)-(c), obtaining geometric measurement data captured by an image capture device, the geometric measurement data representing the fused layer; (e) comparing the geometric measurement data with a standard optical representation representing the fused layer; (f) determining one or more nonconformance conditions between the geometric measurement data representing the fused layer and the standard optical representation; and (g) implementing a control action based at least in part on the one or more nonconformance conditions.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
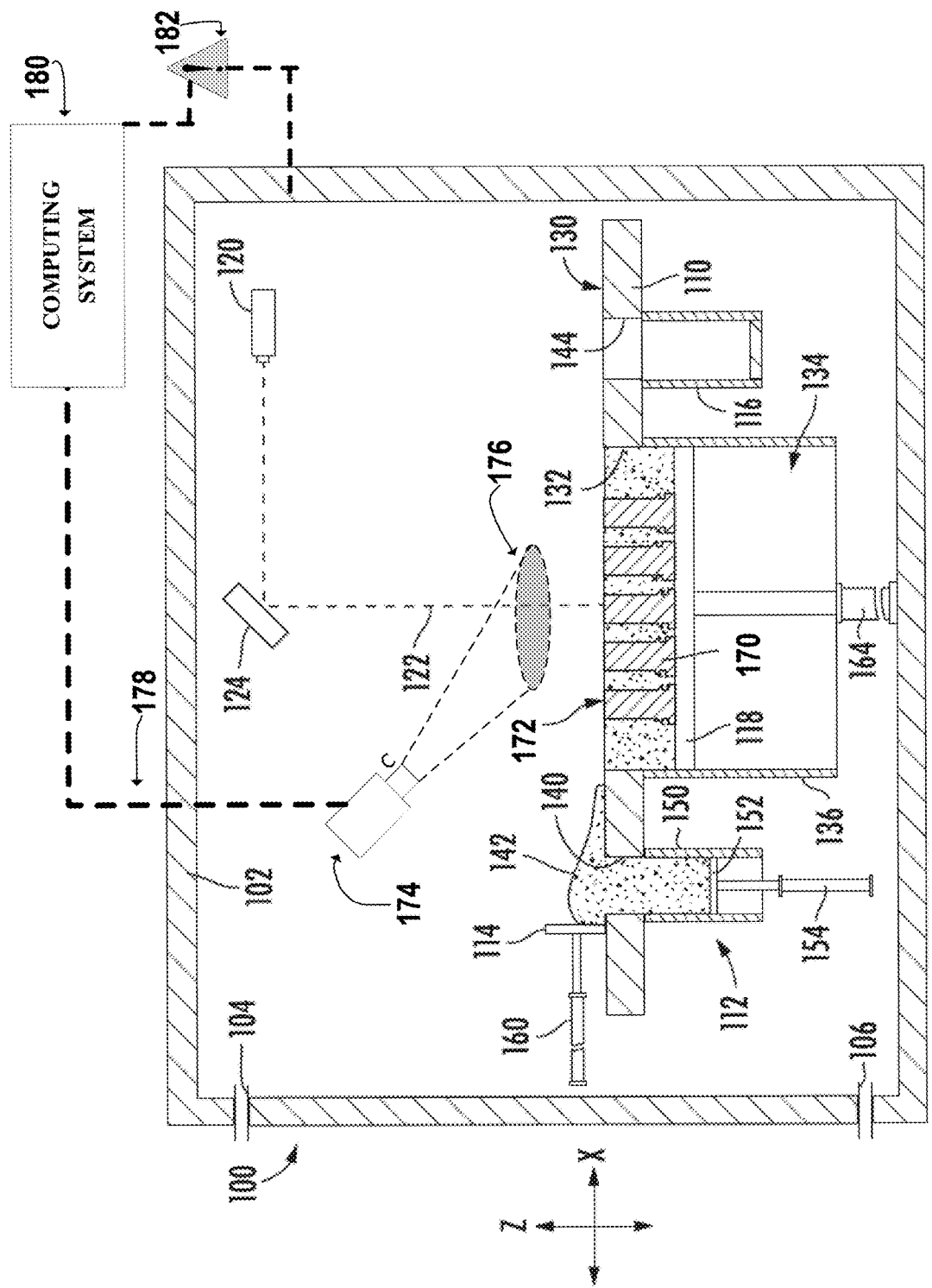
FIG. 1 shows a schematic representation of an additive manufacturing system utilizing in-process optical based monitoring and control of the additive manufacturing process according to example embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. Furthermore, as used herein, terms of approximation, such as "approximately," "substantially," or "about," refer to being within a twenty percent margin of error.

Example embodiments of the present disclosure are directed to systems and methods for controlling an additive manufacturing process. Although additive manufacturing processes provide for the design of complex components that would otherwise be unfeasible to manufacture, inspecting the manufactured components presents a significant challenge. Furthermore, the time and material cost of manufacturing a non-compliant component is a significant risk to a manufacturer.

X-ray computed tomography (CT) can be used to analyze a finished component. However, the higher energy x-rays required for larger components prove a resolution insufficient to properly analyze the component. Furthermore, by only analyzing the finished component, the additive manufacturing system cannot be corrected or stopped during the manufacturing process itself.

As a result, a manufactured component may not conform to a certain quality metric. This nonconformance poses a risk, as traditional imaging techniques may be insufficient to detect the flaw in the component. The inability to detect a flaw can pose challenges. Furthermore, even if the flaw is detected, the completion of the flawed component represents a time and material cost to the manufacturer Accordingly, a system and method for in-process optical based monitoring and control of additive manufacturing processes would be useful. More particularly, a method to dynamically evaluate the quality of individual layers in a layerwise additive manufacturing process and implement a control action based on the evaluation.

Example aspects of the present disclosure utilize geometric measurement data to monitor and control an additive manufacturing process. The additive manufacturing process can deposit a layer of powder onto a surface. The layer of powder can be solidified into a layer of a structure being manufactured. Geometric measurement data that represents the layer can be obtained in a number of ways, including but not limited to infrared imaging, high-resolution cameras, etc. The geometric measurement data can, if necessary, be pre-processed to facilitate evaluation of the layer. For example, the geometric measurement data may undergo contrast enhancement to delineate the shape of the layer.

The geometric measurement data can be compared to a standard optical representation. The standard optical representation can represent an example layer of the structure. The standard optical representation can be, but is not limited to, a file generated by computer-aided design software, a digital image, or binary geometric measurement data.

A digital image of a representative structure can be captured using an image capture device. For example, a digital image of a representative structure may be geometric measurement data depicting a layer in a representative structure. The digital image of a representative structure may be selected based at least in part on a degree of accuracy associated with an optimal depiction of the layer of the representative structure. The digital image of a representative structure may have been captured in a previous additive manufacturing build process or may have been prepared for capture outside of an additive manufacturing build process. For example, an additive manufacturing process may iteratively obtain a plurality of digital images of a representative structure and continuously determine the most accurate digital image to serve as a standard optical representation.

By comparing the geometric measurement data to the standard optical representation, it can be determined whether nonconformance conditions exist. Nonconformance conditions can be conditions where the geometric measurement data does not conform with the standard optical representation. For example, the geometric measurement data representing one edge of a layer that is 3 centimeters longer than the standard optical representation equivalent may be determined a nonconformance condition. In another example, the geometric measurement data representing one edge of a layer that is 0.5 centimeters longer than the standard optical representation equivalent may not be determined a nonconformance condition.

A control action can be implemented based on the one or more nonconformance conditions. The control action can include, but is not limited to, sending a warning signal, stopping the additive manufacturing process, and/or modifying one or more process parameters of the additive manufacturing process. For example, the control action may completely shut down the additive manufacturing process. In another example, the control action may modify the additive manufacturing process to account for one or more nonconformance conditions. In yet another example, the control action may send a warning signal to the additive manufacturing process.

Aspects of the present disclosure provide a number of technical effects and benefits. Geometric measurement data, in comparison to other representations of a layer of a structure, provides higher resolution data to more accurately evaluate the quality of a layer. Based at least in part on its higher resolution, geometric measurement data allows for direct comparison to a standard optical representation, such as a computer-generated representation, a CAD file, etc. Another technical benefit gained from the present disclosure is the ability to evaluate individual layers of a structure while the additive manufacturing process is running, allowing a system to modify and/or stop the additive manufacturing process before a flawed structure is completed.

Example aspects provide an improvement to computing technology. The methods for processing geometric measurement data as described in the present disclosure can provide a more efficient computing algorithm for detecting anomalies in an additive manufacturing process using geometric measurement data acquired by an image capture device. This more efficient computing can allow for processing resources of the additive manufacturing system to be reserved for more core functionality.

As described in detail below, example embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), photo-polymerization based additive processes, extrusion based processes, directed energy deposition processes, and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to example embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An example additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one example embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in example embodiments, several aspects and features of the present subject matter were previously not possible due to manufacturing constraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above provide for much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

Referring now to FIG. 1, an example optical based monitoring and control system will be described according to an example embodiment. The example embodiment utilized an additive manufacturing system such as a DMLS or DMLM system 100 to build a structure 170 comprised of layers 172. It should be appreciated that structure 170 is only an example component to be built and is used primarily to facilitate description of the operation of an additive manufacturing system. The present subject matter is not intended to be limited in this regard, but instead the additive manufacturing system (e.g., the DMLS or DMLM system 100) may be used for building any suitable plurality of components.

As illustrated, system 100 includes a fixed enclosure 102 (or build area 102) that provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an example embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. When additive powder is leveled across the build surface 130, the build surface 130 comprises a surface holding a particulate. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 that is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. For example, energy source 120 may be a laser or any other suitable irradiation emission directing device or irradiation device. In this regard, an irradiation or laser source may originate photons or laser beam irradiation that is directed by the irradiation emission directing device or beam steering apparatus.

According to an example embodiment, beam steering apparatus 124 includes one or more mirrors, prisms, lenses, and/or electromagnets operably coupled with suitable actuators and arranged to direct and focus energy beam 122 (e.g., a laser beam). In this regard, for example, beam steering apparatus 124 may be a galvanometer scanner that moves or scans the focal point of the energy beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. According to example embodiments, beam steering apparatus may further include one or more of the following: optical lenses, deflectors, mirrors, beam splitters, telecentric lenses, etc.

It should be appreciated that other types of energy sources 120 may be used that may use an alternative beam steering apparatus 124. For example, an electron beam gun or other electron source may be used to originate a beam of electrons (e.g., an "e-beam"). The e-beam may be directed by any suitable irradiation emission directing device preferably in a vacuum. When the irradiation source is an electron source, the irradiation emission directing device may be, for example, an electronic control unit that may include, for example, deflector coils, focusing coils, or similar elements. According to still other embodiments, energy source 120 may include one or more of a laser, an electron beam, a plasma arc, an electric arc, etc.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it is substantially flush or coplanar with build surface 130. Build platform 118 is then lowered below build surface 130 by a selected layer increment. The layer increment affects the speed of the additive manufacturing process and the resolution of a components or parts (e.g., structure 170) being manufactured. As an example, the layer increment may be about 10 to 100 micrometers (0.0004 to 0.004 in.).

Figure 3:
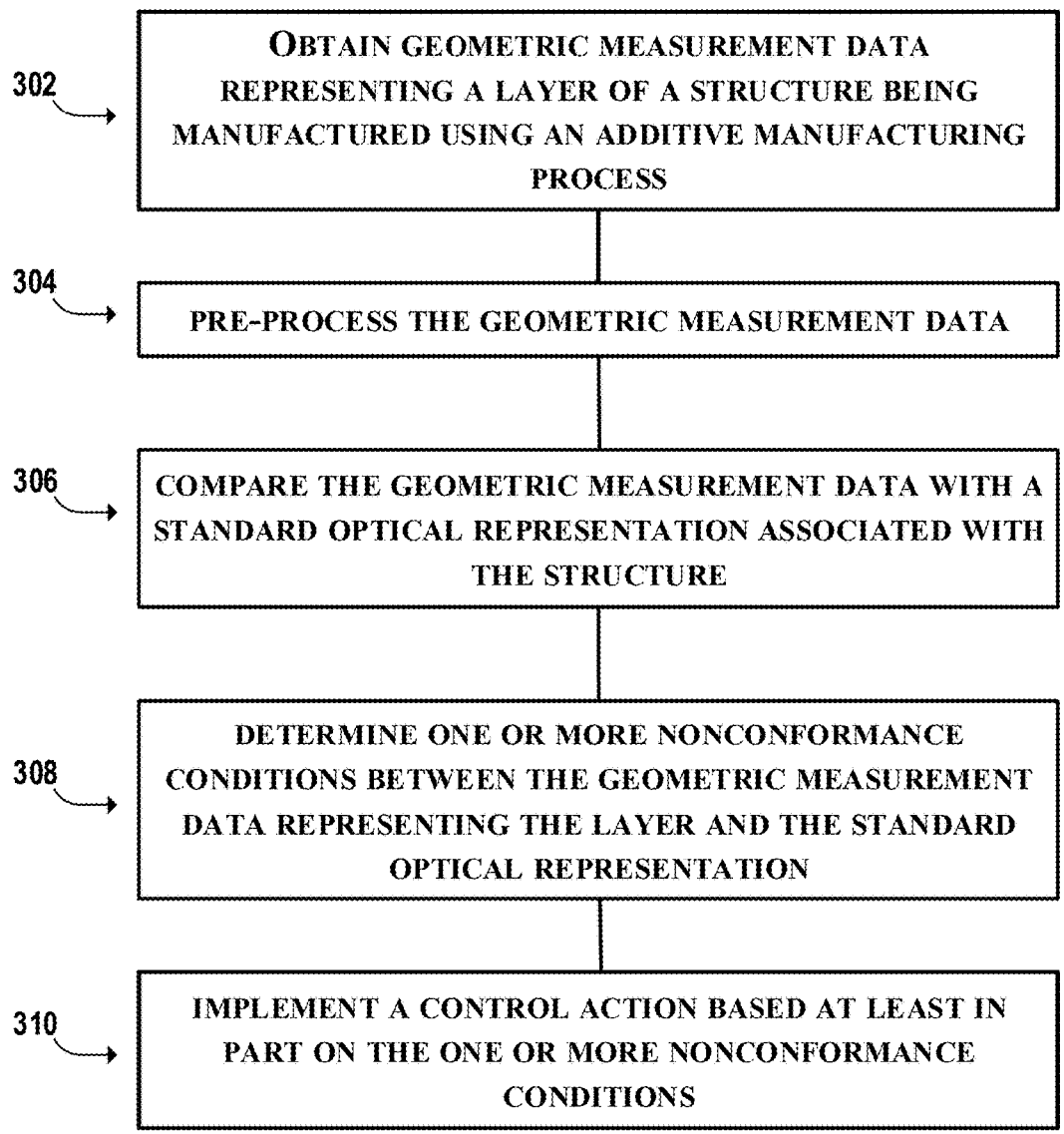
FIG. 3 depicts a flow diagram of an example method for in-process optical based monitoring and control of an additive manufacturing process according to example embodiments of the present subject matter.

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 3). Subsequently, recoater mechanism 114 may be moved back to a starting position.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as powder dispensing apparatus, system, or assembly. The leveled additive powder 142 may be referred to as a "build layer" 172 (see FIG. 4) and the exposed upper surface thereof may be referred to as build surface 130. When additive powder is leveled across the build surface 130, the build surface 130 comprises a surface holding a particulate. When build platform 118 is lowered into build chamber 134 during a build process, build chamber 134 and build platform 118 collectively surround and support a mass of additive powder 142 along with any components (e.g., structure 170) being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component (e.g., structure 170) being built. More specifically, energy beam 122 is emitted from energy source 120 and beam steering apparatus 124 is used to steer the focal point of energy beam 122 over the exposed powder surface in an appropriate pattern (referred to herein as a "toolpath"). A small portion of exposed layer of the additive powder 142 is heated by energy beam 122 to a temperature allowing it to sinter or melt, flow, and consolidate, forming a fused region. This step may be referred to as fusing additive powder 142.

Image data capture device 174 can obtain geometric measurement data 176. Geometric measurement data 176 can be data representing a fused layer 172 of a structure 170. According to some embodiments, geometric measurement data 176 may include one or more of high resolution digital image data, x-ray data, line scanner data, infrared data, pointwise melt pool data (e.g., pointwise melt pool electromagnetic emission data or image data), etc. The geometric measurement data 176 is transmitted via data connector 178 to a computing system 180. Data connector 176 can be a wired or wireless connection.

The computing system 180 can, if necessary, pre-process geometric measurement data 176. Pre-processing may include one or more of enhancing geometric measurement data contrast, transforming geometric measurement data to binary geometric measurement data, and/or rectifying geometric measurement data. For example, geometric measurement data 176 captured at an angle less or more than 90 degrees from the surface of the layer 172 may be rectified to provide a more accurate comparison to the standard optical representation, as will be further described herein with reference to FIG. 4.

The computing system 180 can compare the geometric measurement data 176 with a standard optical representation. The standard optical representation represents an optimal layer of the structure 170. The standard optical representation can be, but is not limited to, a representative file generated by computer-aided design software, a digital image of a representative structure, etc. A digital image of a representative structure can be captured using the geometric measurement data capture device 174. For example, a digital image of a representative structure may be captured geometric measurement data 176 depicting a layer in a representative structure. The digital image of a representative structure may be selected based at least in part on a degree of accuracy associated with an optimal depiction of the layer of the representative structure.

As will further be described herein with reference to FIG. 3, based at least in part on the comparison, the computing system 180 can determine one or more nonconformance conditions between the geometric measurement data 176 and the standard optical representation. For example, a nonconformance condition may represent a single edge of the layer 172 being a certain percentage out of alignment in comparison to the standard optical representation. For another example, a nonconformance condition may represent the layer 172 possessing a certain length, height, or width in comparison to the standard optical representation.

Based at least in part on the one or more nonconformance conditions, the computing system can implement a control action 182. The control action 182 can include, but is not limited to, sending a warning signal, stopping the additive manufacturing process, and/or modifying the process parameters of the additive manufacturing process (e.g., laser power, laser scan speed, beam offset, gain settings, binder jet processes, alignment settings, etc.). For example, the control action 182 may stop the additive manufacturing build process due to a flaw in the current layer. For another example, the control action 182 may modify the process parameters of the build process to account for the one or more nonconformance conditions. In yet another example, the control action 182 may send a warning signal to the additive manufacturing process.

After geometric measurement data is captured and evaluated, build platform 118 is moved vertically downward by the layer increment, and another layer of additive powder 142 is applied in a similar thickness. The directed energy source 120 again emits energy beam 122 and beam steering apparatus 124 is used to steer the focal point of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-fused region. This cycle of moving build platform 118, applying additive powder 142, directing energy beam 122 to melt additive powder 142, and then obtaining and evaluating geometric measurement data representing the layer is repeated until the entire component (e.g., structure 170) is complete.

Figure 2:
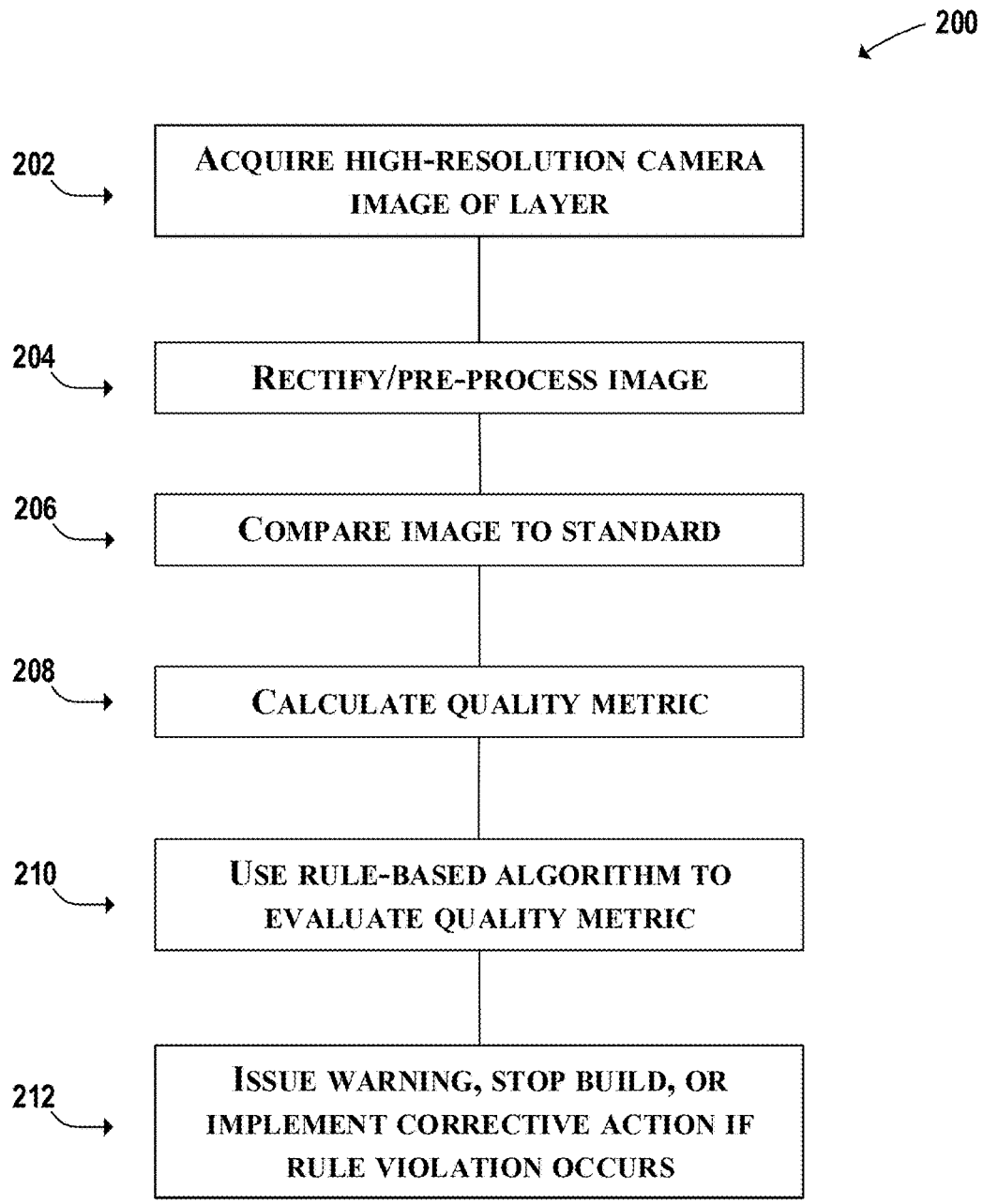
FIG. 2 depicts a flow diagram of an example method for in-process optical based monitoring and control of an additive manufacturing process according to example embodiments of the present subject matter.

FIG. 2 depicts a flow diagram of an example method 200 for in-process optical based monitoring and control of an additive manufacturing process according to example embodiments of the present disclosure. One or more portion(s) of the method 200 can be implemented by one or more computing devices such as, for example, the computing system described in FIG. 6. Moreover, one or more portion(s) of the method 200 can be implemented as an algorithm on the hardware components of the device(s) described herein (e.g., as in FIG. 6) to, for example, obtain and pre-process geometric measurement data. FIG. 2 depicts elements performed in a particular order for purposes of illustration and discussion. Those of ordinary skill in the art, using the disclosures provided herein, will understand that the elements of any of the methods discussed herein can be adapted, rearranged, performed simultaneously, expanded, omitted, combined, and/or modified in various ways without deviating from the scope of the present disclosure.

At (202), the method 200 can include acquiring a high-resolution camera image of a layer. For instance, an image capture device 174 can obtain geometric measurement data 176, the geometric measurement data 176 comprising a high-resolution camera image representing a layer of a structure being manufactured using an additive manufacturing process. The optical capture device can transmit the geometric measurement data to a computing system 180.

At (204), the method 200 can include rectifying and/or pre-processing the image. For example, a computing system 180 may receive geometric measurement data 176 comprising a high resolution camera image from an image capture device 174. The computing system 180 may then rectify and/or pre-process the geometric measurement data 176. Pre-processing the geometric measurement data 176 may include, but is not limited to, at least one of enhancing image contrast, transforming the image to binary geometric measurement data, sharpening the image, pixel brightness transformation, interpolation, geometric transformation, detection of one or more edges of the layer of the structure, etc. For example, the computing system 180 may determine that the geometric measurement data 176 was captured by the geometric measurement data capture device 174 at an angle less or more than 90 degrees, and may therefore rectify the geometric measurement data 176 to account for perspective or other forms of distortion in the image to facilitate comparison to a standard optical representation. In another example, the computing system 180 may determine that the fidelity of geometric measurement data 176 is insufficient for comparison, and may therefore pre-process the geometric measurement data 176 by increasing its contrast. In yet another example, the computing system 180 may determine that the geometric measurement data 176 should be transformed to binary geometric measurement data to facilitate comparison with the standard optical representation.

At (206), the method 200 can include comparing the image to a standard. For example, the computing system 180 may compare the geometric measurement data 176 to a standard optical representation. The standard optical representation can be, but is not limited to, a computer-generated representation of the structure being manufactured generated by computer-aided design (CAD) software, a digital image of a representative structure, etc. For example, the geometric measurement data 176 may be spatially divided into spatial regions and compared to the standard optical representation to detect difference regions between the geometric measurement data 176 and a standard optical representation. In another example, the geometric measurement data 176 may be transformed to binary geometric measurement data and then subtracted from the standard optical representation. In yet another example, the computing system 180 may measure difference regions between the geometric measurement data 176 and the standard optical representation.

At (208), the method 200 may, based at least in part on the comparison between the geometric measurement data 176 and the standard optical representation, calculate a quality metric. The quality metric can be, but is not limited to, detecting nonconformance conditions. Nonconformance conditions can be locations(s) where the geometric measurement data 176 differs from the standard optical representation. For example, a nonconformance condition may represent a single edge of the layer 172 represented by geometric measurement data 176 being a certain percentage out of alignment in comparison to the standard optical representation. For another example, a nonconformance condition may represent the layer 172 represented by geometric measurement data 176 possessing a certain length, height, or width in comparison to the standard optical representation.

At (210), the method 200 may use a rule based algorithm to evaluate the quality metric. The rule based algorithm may be implemented by the hardware of computing system 180. The rule based algorithm can determine, based on the quality metric, if a rule violation occurs. For example, a rule violation may occur if a certain number of nonconformance conditions are detected. For another example, a rule violation may occur if a nonconformance condition of a certain severity is detected. In yet another example, a rule violation may occur if a certain number of nonconformance conditions, each nonconformance condition being of a certain severity, are detected.

At (212), the method 200 may, based at least in part on the rule violation(s), implement a corrective action. The corrective action can include a control action 182, wherein a control action 182 can be, but is not limited to, sending a warning signal, stopping the additive manufacturing process, and/or modifying the additive manufacturing process. For example, the control action 182 may stop the additive manufacturing process due to a flaw in the current layer 172. In another example, the control action 182 may modify one or more process parameters the additive manufacturing process to account for one or more nonconformance conditions. In yet another example, the control action 182 may comprise sending a warning to the additive manufacturing system that a rule violation has occurred.

FIG. 3 depicts a flow diagram of an example method 300 for in-process optical based monitoring and control of an additive manufacturing process according to example embodiments of the present disclosure. One or more portion(s) of the method 300 can be implemented by one or more computing devices such as, for example, the computing system described in FIG. 6. Moreover, one or more portion(s) of the method 300 can be implemented as an algorithm on the hardware components of the device(s) described herein (e.g., as in FIG. 6) to, for example, obtaining and pre-processing geometric measurement data. FIG. 3 depicts elements performed in a particular order for purposes of illustration and discussion. Those of ordinary skill in the art, using the disclosures provided herein, will understand that the elements of any of the methods discussed herein can be adapted, performed simultaneously, rearranged, expanded, omitted, combined, and/or modified in various ways without deviating from the scope of the present disclosure.

At (302), the method 300 can include obtaining geometric measurement data representing a layer of a structure being manufactured using an additive manufacturing process (e.g., powder bed fusion process, photo-polymerization based additive process, binder jet process, extrusion based process, directed energy deposition process, etc.). For instance, a geometric measurement data capture device 174 can obtain geometric measurement data 176, the geometric measurement data 176 comprising a high-resolution camera image representing a layer of a structure being manufactured using an additive manufacturing process. In some embodiments, the geometric measurement data 176 can include one or more of high resolution image data, x-ray data, infrared data, etc. The optical capture device can transmit the geometric measurement data 176 to a computing system 180.

At (304), the method 300 can include pre-processing the geometric measurement data. For example, a computing system 180 may receive geometric measurement data 176 comprising a high resolution camera image from an image capture device 174. The computing system 180 may then pre-process the geometric measurement data 176. Pre-processing the geometric measurement data 176 may include, but is not limited to, at least one of rectifying the data, enhancing geometric measurement data contrast, transforming the geometric measurement data to binary geometric measurement data, sharpening the geometric measurement data, pixel brightness transformation, interpolation, geometric transformation, etc. For example, the computing system 180 may determine that the geometric measurement data 176 was captured by the image capture device 174 at an angle less or more than 90 degrees and may therefore rectify the geometric measurement data 176 to facilitate comparison to a standard optical representation. In another example, the computing system 180 may determine that the fidelity of geometric measurement data 176 is insufficient for comparison to the standard optical representation and may therefore pre-process the geometric measurement data 176 by increasing its contrast. In yet another example, the computing system 180 may determine that the geometric measurement data 176 should be transformed to binary geometric measurement data to facilitate comparison with the standard optical representation.

At (306), the method 300 can include comparing the geometric measurement data with a standard optical representation associated with the structure. For example, the computing system 180 may compare the geometric measurement data 176 to a standard optical representation associated with the structure 170. The standard optical representation can be, but is not limited to, a representative file generated by computer-aided design (CAD) software, a digital image of a representative structure, etc. In one example, the geometric measurement data 176 may be spatially divided into one or more spatial regions and compared to the standard optical representation. In another example, the geometric measurement data 176 may be transformed to binary geometric measurement data and then subtracted from the standard optical representation. In yet another example, the computing system 180 may measure difference regions between the geometric measurement data 176 and the standard optical representation.

At (308), the method 300 may, based at least in part on the comparison between the geometric measurement data and the standard optical representation, determine one or more nonconformance conditions between the geometric measurement data representing the layer 172 and the standard optical representation. Nonconformance conditions can be locations(s) where the geometric measurement data 176 differs from the standard optical representation. For example, a nonconformance condition may represent a single edge of the layer 172 represented by geometric measurement data 176 being a certain percentage out of alignment in comparison to the standard optical representation. For another example, a nonconformance condition may represent the layer 172 represented by geometric measurement data 176 possessing a certain length, height, or width in comparison to the standard optical representation.

In some implementations, determining the one or more nonconformance conditions can include dividing the geometric measurement data into one or more spatial regions. As an example, the geometric measurement data can be divided into four discrete regions, each of the four regions including a special feature (e.g., an edge or other feature of the layer, etc.). In some implementations, determining the one or more nonconformance conditions can further include comparing the optical data with the standard optical representation and determining one or more nonconformance conditions for the one or more spatial regions. The one or more nonconformance conditions can be based at least in part on a difference between the geometric measurement data and the standard optical representation for the one or more spatial regions.

In some implementations, the difference between the geometric measurement data and the standard optical representation for the one or more spatial regions can include a deviation between one or more specific features of the geometric measurement data and one or more specific features of the standard optical representation (e.g., a univariate comparison, etc.). The one or more specific features can be measurable and/or recognizable aspects of the geometric measurement data (e.g., one or more structure dimensions, one or more pixel grayscale values, image derivative(s), a number of pixels exceeding an intensity threshold, etc.)

In some implementations, determining the nonconformance condition for the one or more spatial regions can include combining a plurality of specific features of the geometric measurement data into a nonconformance composite. As an example, each spatial region of four spatial regions can be composited (e.g., a composite of the specific features of each spatial region, a composite of proxy(s) of the specific features of each spatial region, etc.) to generate a nonconformance composite that represents the relative nonconformance of the layer.

In some implementations, determining the nonconformance condition for the one or more spatial regions can further include determining a nonconformance condition for the one or more spatial regions based at least in part on a difference between the nonconformance composite and the standard optical representation for the one or more spatial regions. As an example, the nonconformance composite may indicate one or more grayscale pixel values with values outside a difference threshold in comparison to the standard optical representation. As another example, the nonconformance composite may indicate one or more edges of the structure with alignment outside of a difference threshold in comparison to the standard optical representation.

At (310), the method 300 may implement a control action 182 based at least in part on the one or more nonconformance conditions. The control action 182 can include, but is not limited to, sending a warning signal, stopping the additive manufacturing process, and/or modifying one or more process parameters of the additive manufacturing process. For example, the control action 182 may completely shut down the additive manufacturing process. In another example, the control action 182 may modify the additive manufacturing process to account for one or more nonconformance conditions. In yet another example, the control action 182 may send a warning signal to the additive manufacturing process.

Figure 4:
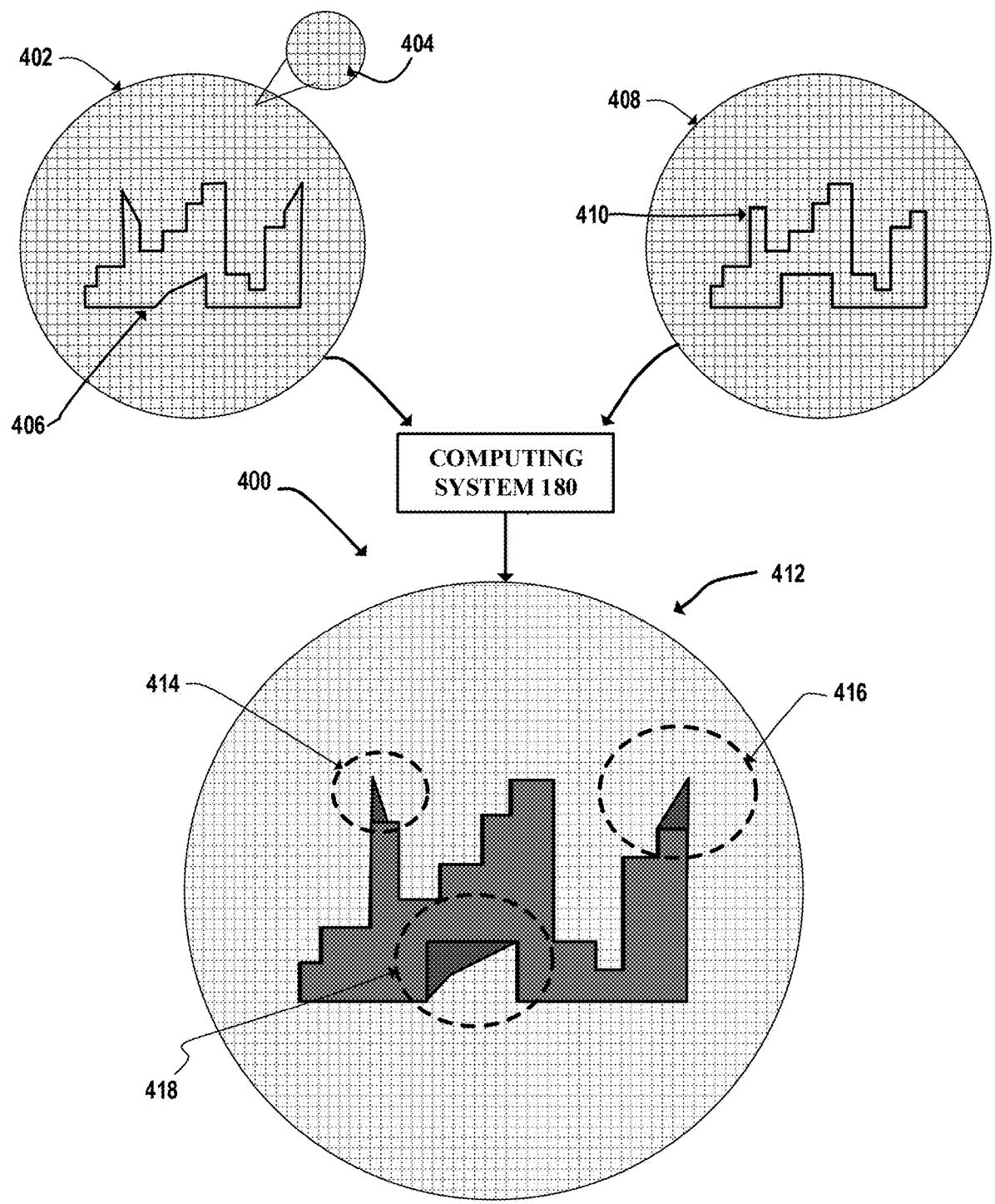
FIG. 4 shows an example of optical based monitoring of a layer in a layerwise additive manufacturing system according to example embodiments of the present disclosure.

FIG. 4 an example of optical based monitoring of a layer in a layerwise additive manufacturing system according to example embodiments of the present disclosure. As illustrated, FIG. 4 depicts a comparison 400 performed by computing system 180 between geometric measurement data 402 representing a layer 406 and a standard optical representation 408 representing an optimal layer 410. FIG. 4 further depicts difference regions (e.g., 414, 416, and 418) detected by difference region evaluation 412.

Comparison 400 depicts a comparison between geometric measurement data 402 and standard optical representation 408. The comparison 400 can be, but is not required to be, performed by the computing system 180. The geometric measurement data 402 represents a layer 406 of a structure 170 (e.g., layer 172). The geometric measurement data 402 can be, but is not limited to, at least one of high resolution image data, infrared data, etc. The geometric measurement data 402 can be pre-processed to facilitate a comparison 400 with the standard optical representation 408. Pre-processing can include, but is not limited to, at least one of enhancing geometric measurement data contrast, transforming the geometric measurement data to binary geometric measurement data, sharpening the geometric measurement data, pixel brightness transformation, interpolation, geometric transformation, etc.

Comparison 400 can be performed in a number of ways, including but not limited to spatially dividing the geometric measurement data 402 into one or more spatial regions 404, transforming the geometric measurement data 402 to binary geometric measurement data, and/or measuring difference regions between the geometric measurement data 402 and the standard optical representation 408.

By way of example, both the geometric measurement data 402 and the standard optical representation can be spatially divided into one or more spatial regions 404. As depicted in FIG. 4, the spatial regions can be divided into a plurality of spatial regions represented as a grid pattern. Division into spatial region(s) facilitates the comparison 400 between layer 406 and optimal layer 410. For example, the division into a grid pattern facilitates the comparison 400 by computing system 180 by enabling the computing system 180 to measure difference regions between the layer 406 and the optimal layer 410.

Difference regions can be calculated by the computing system 180 by superimposing the standard optical representation 408 over the geometric measurement data 402. For example, difference region evaluation 412 depicts the standard optical representation 408 superimposed over the geometric measurement data 402. Difference regions (e.g., 414, 416, and 418) can be calculated determining that a spatial region 404 contains a disparity between the layer 406 and the optimal layer 410. For example, the computing system may calculate a difference region at 414, 416, and/or 418, as each contain a disparity between the layer 406 and the optimal layer 410.

Nonconformance conditions can be locations where a material disparity is detected between the layer 406 and the optimal layer 410. The computing system 180 can determine nonconformance conditions based on the calculated difference regions (e.g., 414, 416, and 418). For example, the computing system 180 may determine that difference region 414 does not represent a nonconformance condition because the disparity between the layer 406 and the optimal layer 410 is not material. For another example, the computing system may determine that difference region 416 does represent a nonconformance condition because the disparity between the layer 406 and the optimal layer 410 constitutes a material disparity.

Figure 5:
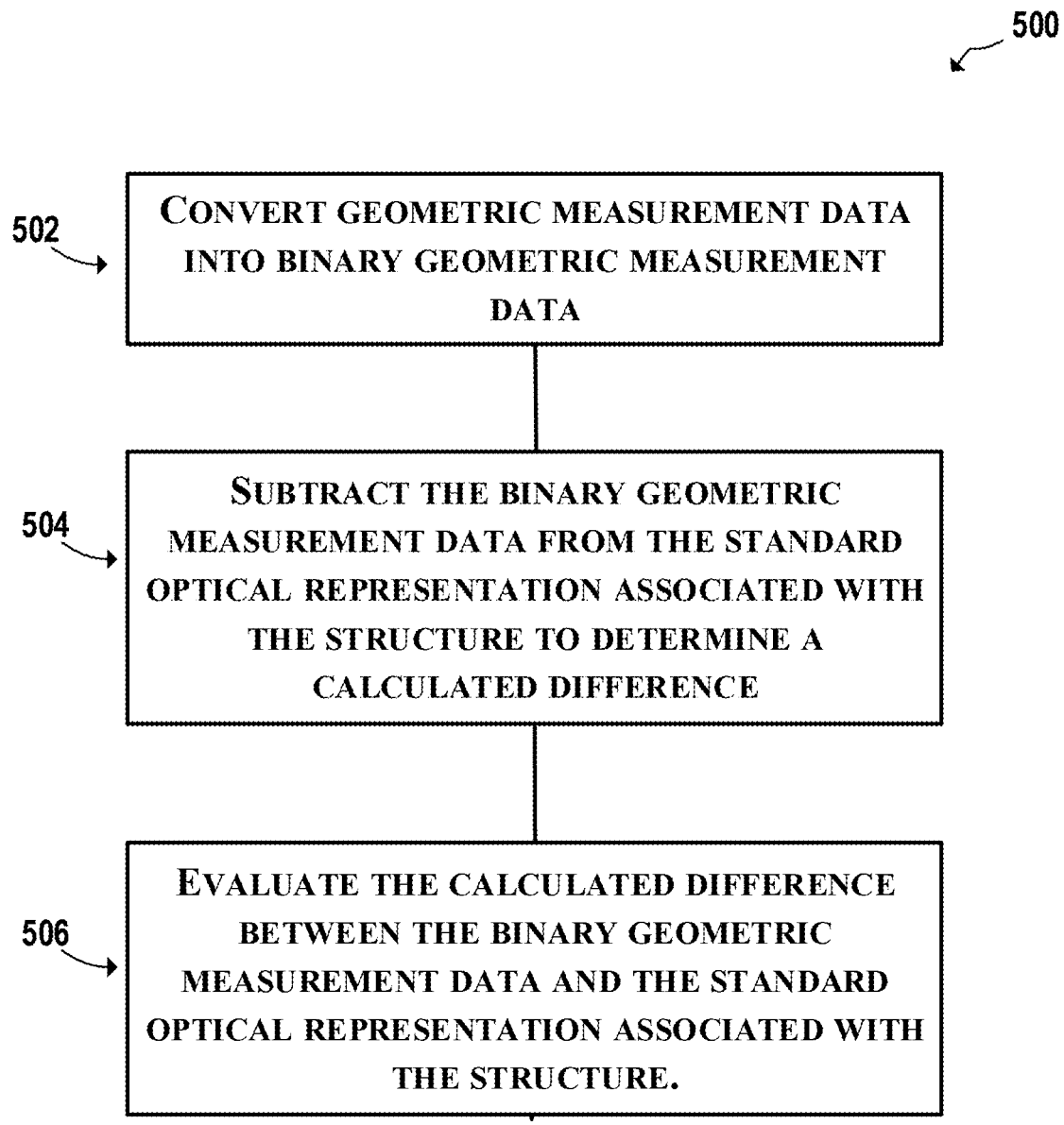
FIG. 5 depicts a flow diagram of an example method for determining one or more nonconformance conditions between the geometric measurement data representing the layer and the standard optical representation according to example embodiments of the present subject matter.

FIG. 5 depicts a flow diagram of an example method 500 for determining one or more nonconformance conditions between the geometric measurement data representing the layer and the standard optical representation according to example embodiments of the present subject matter.

Figure 6:
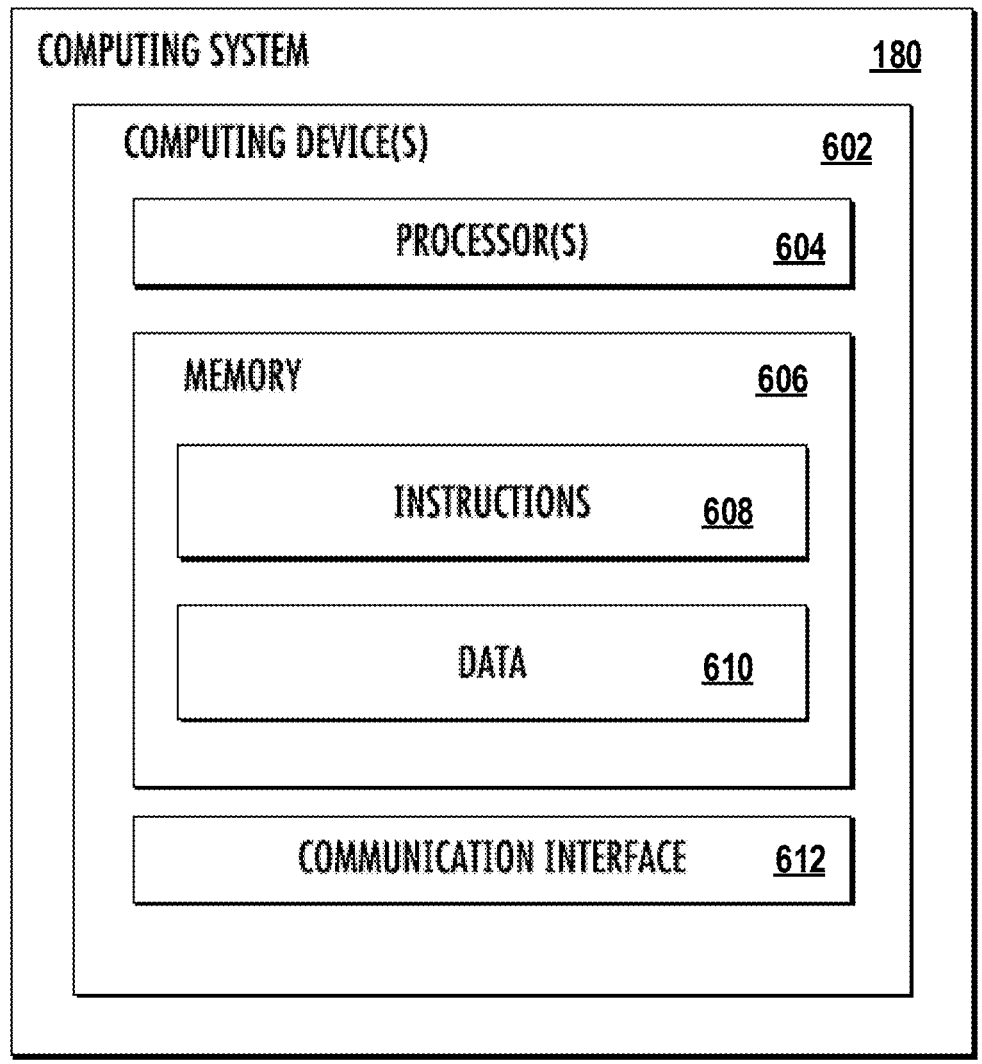
FIG. 6 shows a block diagram of a computing system according to example embodiments of the present disclosure.

One or more portion(s) of the method 500 can be implemented by one or more computing devices such as, for example, the computing system described in FIG. 6. Moreover, one or more portion(s) of the method 500 can be implemented as an algorithm on the hardware components of the device(s) described herein (e.g., as in FIG. 6) to, for example, obtain and pre-process geometric measurement data. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include transforming geometric measurement data into binary geometric measurement data. Binary geometric measurement data can be, but is not limited to, digital image data possessing two possible color values. For example, high resolution image data can comprise a plurality of pixels, each pixel possessing one of a plurality of color values. When transformed to binary data, the color of each pixel of the plurality of pixels can be transformed to one of two possible color values. In some embodiments, transforming geometric measurement data to binary geometric measurement data can include one or more operations. For example, transforming geometric measurement data to binary geometric measurement data may include transforming the geometric measurement data to grayscale geometric measurement data, inverting the geometric measurement data, and/or calculating a threshold value.

At (504), the method 500 may subtract the binary geometric measurement data from the standard optical representation associated with the structure to determine a calculated difference. The standard optical representation associated with the structure can be, but is not limited to, binary geometric measurement data. In some embodiments, calculating the difference can include one or more operations. For example, one operation may include subtracting each pixel of the binary geometric measurement data from a corresponding pixel of the standard optical representation. In another example, one operation may include subtracting every other pixel of the binary geometric measurement data from a corresponding pixel of the standard optical representation. In yet another example, the operation may include subtracting one or more pixels in one or more determined regions of the binary geometric measurement data from the corresponding one or more pixels in one or more determined regions of the standard optical representation. The calculated difference can be stored as a data structure (e.g., a map, array, vector, database, etc.), variable, object, or any other suitable form.

At (506), the method 500 can evaluate the calculated difference between the binary geometric measurement data and the standard optical representation associated with the structure. Evaluating the calculated difference can be, but is not limited to, detecting one or more nonconformance conditions. Nonconformance conditions can be based, at least in part, on the calculated difference. For example, a calculated difference of a certain severity may represent a nonconformance condition. In another example, a calculated difference may be determined as low enough to not represent a nonconformance condition. In yet another example, the calculated difference may be stored as a data structure representing one or more regions, each region evaluated to determine a nonconformance condition.

FIG. 6 shows a block diagram of the computing system 180 of FIG. 1 that may be used by a distributed control system, or other systems to implement methods and systems according to example embodiments of the present disclosure. As shown, the computing system 180 may include one or more computing device(s) 602. The one or more computing device(s) 602 may include one or more processor(s) 604 and one or more memory device(s) 606. The one or more processor(s) 604 may include any suitable processing device, such as a microprocessor, microcontroller, integrated circuit, logic device, or other suitable processing device. The one or more memory device(s) 606 may include one or more computer-readable media, including, but not limited to, non-transitory computer-readable media, RAM, ROM, hard drives, flash drives, or other memory devices.

The one or more memory device(s) 606 may store information accessible by the one or more processor(s) 604, including computer-readable instructions 608 that may be executed by the one or more processor(s) 604. The instructions 608 may be any set of instructions that when executed by the one or more processor(s) 604, cause the one or more processor(s) 604 to perform operations. The instructions 608 may be software written in any suitable programming language or may be implemented in hardware. In some embodiments, the instructions 608 may be executed by the one or more processor(s) 604 to cause the one or more processor(s) 604 to perform operations, such as implementing one or more of the processes mentioned above.

The memory device(s) 604 may further store data 610 that may be accessed by the processor(s) 604. For example, the data 610 may include geometric measurement data representing a layer of a structure being manufactured using an additive manufacturing process, as described herein. The data 610 may include one or more table(s), function(s), algorithm(s), model(s), equation(s), etc. according to example embodiments of the present disclosure.

The one or more computing device(s) 602 may also include a communication interface 612 used to communicate, for example, with the other components of system. The communication interface 612 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Further aspects of the invention are provided by the subject matter of the following clauses:

1. A method for monitoring a layerwise additive manufacturing process, the method comprising: obtaining, by a computing system comprising one or more computing devices, geometric measurement data captured by an image capture device, the geometric measurement data representing a layer of a structure being manufactured using an additive manufacturing process; comparing, by the computing system, the geometric measurement data with a standard optical representation associated with the structure; determining, by the computing system, one or more nonconformance conditions between the geometric measurement data representing the layer and the standard optical representation; and implementing, by the computing system, a control action based at least in part on the one or more nonconformance conditions.

2. The method of any preceding clause, wherein the method further comprises: pre-processing, by the computing system, the geometric measurement data, wherein pre-processing the geometric measurement data comprises at least one of transforming the geometric measurement data to binary geometric measurement data, rectifying the geometric measurement data, detecting one or more edges of the layer of the structure represented by the geometric measurement data, or enhancing a contrast of the geometric measurement data.

3. The method of any preceding clause, wherein the geometric measurement data can include at least one of digital image data, infrared data, line scanner data, or pointwise melt pool electromagnetic emission or image data.

4. The method of any preceding clause, wherein the standard optical representation associated with the structure comprises a computer-generated representation of the structure being manufactured or a digital image of a representative structure being manufactured.

5. The method of any preceding clause, wherein the computer-generated representation of the structure being manufactured comprises a file generated, at least in part, by computer-aided design (CAD) software.

6. The method of any preceding clause, wherein determining one or more nonconformance conditions comprises: dividing, by the computing system, the geometric measurement data into one or more spatial regions; comparing, by the computing system, the optical data with the standard optical representation; and determining, by the computing system, one or more nonconformance conditions for the one or more spatial regions based at least in part on a difference between the geometric measurement data and the standard optical representation for the one or more spatial regions.

7. The method of any preceding clause, wherein the difference between the geometric measurement data and the standard optical representation for the one or more spatial regions comprises a deviation between one or more specific features of the geometric measurement data and one or more specific features of the standard optical representation.

8. The method of any preceding clause, wherein the one or more specific features comprises one or more of: one or more structure dimensions; one or more pixel grayscale values; image derivatives; and a number of pixels exceeding an intensity threshold.

9. The method of any preceding clause, wherein determining, by the computing system, one or more nonconformance conditions for the one or more spatial regions based at least in part on a difference between the geometric measurement data and the standard optical representation for the one or more spatial regions comprises: combining, by the computing system, a plurality of specific features of the geometric measurement data into a nonconformance composite; and determining, by the computing system, a nonconformance condition for the one or more spatial regions based at least in part on a difference between the nonconformance composite and the standard optical representation for the one or more spatial regions.

10. The method of any preceding clause, wherein determining, by the computing system, one or more nonconformance conditions between the geometric measurement data representing the layer and the standard optical representation comprises: converting, by the computing system, the geometric measurement data into binary geometric measurement data; subtracting, by the computing system, the binary geometric measurement data from the standard optical representation associated with the structure to determine a calculated difference; and evaluating, by the computing system, the calculated difference between the binary geometric measurement data and the standard optical representation associated with the structure.

11. The method of any preceding clause, wherein the control action comprises one or more of sending a warning signal, stopping the layerwise additive manufacturing process, or modifying one or more process parameters of the layerwise additive manufacturing process.

12. The method of any preceding clause, wherein the one or more process parameters comprise one or more of: a laser power; a laser scan speed; a beam offset; one or more gain settings; one or more binder jet processes; and one or more alignment settings.

13. A system for monitoring a layerwise additive manufacturing process, the system comprising: a surface configured to hold one or more layers of a structure being manufactured by the layerwise additive manufacturing process; an image capture device configured to obtain geometric measurement data of the structure during the layerwise additive manufacturing process; one or more processors; and one or more memory devices, the one or more memory devices storing computer-readable instructions that when executed by the one or more processors cause the one or more processors to perform operations, the operations comprising: obtaining geometric measurement data captured by an imaging system, the geometric measurement data representing a layer of the one or more layers of the structure being manufactured using an additive manufacturing process; comparing the geometric measurement data with a standard optical representation associated with the structure; determining one or more nonconformance conditions between the geometric measurement data representing the layer and the standard optical representation; and implementing a control action based at least in part on the one or more nonconformance conditions.

14. The system of any preceding clause, wherein the layerwise additive manufacturing process comprises: a powder bed fusion process; a photo-polymerization based additive process; a binder jet process; a extrusion based process; or a directed energy deposition process.

15. The system of any preceding clause, wherein the operations further comprise: pre-processing the geometric measurement data, wherein pre-processing the geometric measurement data comprises at least one of transforming the geometric measurement data to binary geometric measurement data, rectifying the geometric measurement data, detecting one or more edges of the layer of the structure represented by the geometric measurement data, or enhancing a contrast of the geometric measurement data.

16. The system of any preceding clause, wherein the operation of determining one or more nonconformance conditions comprises: dividing the geometric measurement data into one or more spatial regions; comparing the optical data with the standard optical representation; and determining a nonconformance condition for the one or more spatial regions based at least in part on a difference between the geometric measurement data and the standard optical representation for the one or more spatial regions.

17. The system of any preceding clause, wherein the operation of determining one or more nonconformance conditions between the geometric measurement data representing the layer and the standard optical representation comprises: converting the geometric measurement data into binary geometric measurement data; subtracting the binary geometric measurement data from the standard optical representation associated with the structure to determine a calculated difference; and evaluating the calculated difference between the binary geometric measurement data and the standard optical representation associated with the structure.

18. The system of any preceding clause, wherein the control action comprises one or more of sending a warning signal, stopping the layerwise additive manufacturing process, or modifying one or more process parameters of the layerwise additive manufacturing process.

19. A method of manufacturing a part by laser additive manufacturing comprising: (a) irradiating a layer of powder in a powder bed to form a fused layer; (b) providing a subsequent layer of powder over the powder bed by passing a recoater mechanism over the powder bed; (c) repeating steps (a) and (b) to form the part in the powder bed; (d) while conducting steps (a)-(c), obtaining geometric measurement data captured by an image capture device, the geometric measurement data representing the fused layer; (e) comparing the geometric measurement data with a standard optical representation representing the fused layer; (f) determining one or more nonconformance conditions between the geometric measurement data representing the fused layer and the standard optical representation; and (g) implementing a control action based at least in part on the one or more nonconformance conditions.

20. The method of any preceding clause, wherein obtaining geometric measurement data further comprises: pre-processing the geometric measurement data, wherein pre-processing the geometric measurement data comprises at least one of transforming the geometric measurement data to binary geometric measurement data, rectifying the geometric measurement data, detecting one or more edges of the fused layer of the structure represented by the geometric measurement data, or enhancing a contrast of the geometric measurement data.

Aspects of the disclosure have been described in terms of illustrative embodiments thereof. Numerous other embodiments, modifications, and/or variations within the scope of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A method for monitoring a layerwise additive manufacturing process, the method comprising:
    obtaining, by a computing system comprising one or more computing devices, geometric measurement data captured by an image capture device, the geometric measurement data representing a layer of a structure being manufactured using an additive manufacturing process;
    pre-processing, by the computing system, the geometric measurement data, wherein pre-processing the geometric measurement data comprises transforming the geometric measurement data to binary geometric measurement data such that each pixel of the geometric measurement data is transformed to one of two possible color values;
    comparing, by the computing system, the geometric measurement data with a standard optical representation associated with the structure;
    determining, by the computing system, one or more nonconformance conditions between the geometric measurement data representing the layer and the standard optical representation; and
    implementing, by the computing system, a control action for the additive manufacturing process based at least in part on the one or more nonconformance conditions, the control action including one or more of sending a warning signal, stopping the layerwise additive manufacturing process, or modifying one or more process parameters of the layerwise additive manufacturing process,
    wherein determining one or more nonconformance conditions comprises:
        dividing, by the computing system, the geometric measurement data representing the layer into a plurality of spatial regions;
        comparing, by the computing system, each of the plurality of spatial regions of the optical data with the standard optical representation; and
        determining, by the computing system, one or more nonconformance conditions for the plurality of spatial regions based at least in part on a difference between the geometric measurement data and the standard optical representation for the plurality of spatial regions.

2. The method of claim 1, wherein the geometric measurement data can include at least one of digital image data, infrared data, line scanner data, or pointwise melt pool electromagnetic emission or image data.

3. The method of claim 1, wherein the standard optical representation associated with the structure comprises a computer-generated representation of the structure being manufactured or a digital image of a representative structure being manufactured.

4. The method of claim 3, wherein the computer-generated representation of the structure being manufactured comprises a file generated, at least in part, by computer-aided design (CAD) software.

5. The method of claim 1, wherein the difference between the geometric measurement data and the standard optical representation for the plurality of spatial regions comprises a deviation between one or more specific features of the geometric measurement data and one or more specific features of the standard optical representation.

6. The method of claim 5, wherein the one or more specific features comprises one or more of:
   one or more structure dimensions;
   one or more pixel grayscale values;
   image derivatives; and
   a number of pixels exceeding an intensity threshold.

7. The method of claim 1, wherein determining, by the computing system, one or more nonconformance conditions for the plurality of spatial regions based at least in part on a difference between the geometric measurement data and the standard optical representation for the plurality of spatial regions comprises:
   combining, by the computing system, a plurality of specific features of the geometric measurement data into a nonconformance composite; and
   determining, by the computing system, a nonconformance condition for the plurality of spatial regions based at least in part on a difference between the nonconformance composite and the standard optical representation for the plurality of spatial regions s.

8. The method of claim 1, wherein determining, by the computing system, one or more nonconformance conditions between the geometric measurement data representing the layer and the standard optical representation comprises:
   subtracting, by the computing system, the binary geometric measurement data from the standard optical representation associated with the structure to determine a calculated difference; and
   evaluating, by the computing system, the calculated difference between the binary geometric measurement data and the standard optical representation associated with the structure.

9. The method of claim 1, wherein the one or more process parameters comprise one or more of: a laser power; a laser scan speed; a beam offset; one or more gain settings; one or more binder jet processes; and one or more alignment settings.

10. A method of manufacturing a part by laser additive manufacturing comprising:
   (a) irradiating a layer of powder in a powder bed to form a fused layer;
   (b) providing a subsequent layer of powder over the powder bed by passing a recoater mechanism over the powder bed;
   (c) repeating steps (a) and (b) to form the part in the powder bed;
   (d) while conducting steps (a)-(c), obtaining geometric measurement data captured by an image capture device, the geometric measurement data representing the fused layer;
   (e) pre-processing, by a computing system, the geometric measurement data, wherein pre-processing the geometric measurement data comprises transforming the geometric measurement data to binary geometric measurement data such that each pixel of the geometric measurement data is transformed to one of two possible color values;
   (f) comparing the geometric measurement data with a standard optical representation representing the fused layer;
   (g) determining one or more nonconformance conditions between the geometric measurement data representing the fused layer and the standard optical representation; and
   (h) implementing a control action for the additive manufacturing process based at least in part on the one or more nonconformance conditions, the control action including one or more of sending a warning signal, stopping the layerwise additive manufacturing process, or modifying one or more process parameters of the layerwise additive manufacturing process,
   wherein determining one or more nonconformance conditions comprises: dividing, by the computing system, the geometric measurement data representing the layer into a plurality of spatial regions; comparing, by the computing system, each of the plurality of spatial regions of the optical data with the standard optical representation; and determining, by the computing system, one or more nonconformance conditions for the plurality of spatial regions based at least in part on a difference between the geometric measurement data and the standard optical representation for the plurality of spatial regions.

* * * * *